US012785930B2

(12) United States Patent
Bermejo et al.

(10) Patent No.: US 12,785,930 B2
(45) Date of Patent: Nov. 3, 2026

(54) METHOD AND SYSTEM FOR MODIFYING DOCUMENT WITHOUT CHANGING HASH VALUE

(71) Applicant: Multiverse Computing S.L., Donostia / San Sebastián (ES)

(72) Inventors: Pablo Bermejo, Donostia / San Sebastián (ES); Román Orús, Donostia / San Sebastián (ES); Borja Aizpurua, Donostia / San Sebastián (ES)

(73) Assignee: Multiverse Computing S.L., Donostia (ES)

( * ) Notice: Subject to any disclaimer, the term of this patent is extended or adjusted under 35 U.S.C. 154(b) by 918 days.

(21) Appl. No.: 18/106,555

(22) Filed: Feb. 7, 2023

(65) Prior Publication Data

US 2024/0265195 A1 Aug. 8, 2024

(51) Int. Cl.

| | |
|---|---|
| ***H04L 9/06*** | (2006.01) |
| ***G06F 16/901*** | (2019.01) |
| ***G06F 40/166*** | (2020.01) |
| ***G06N 7/00*** | (2023.01) |
| ***G06N 10/20*** | (2022.01) |
| ***G06N 10/40*** | (2022.01) |

(52) U.S. Cl.

CPC ........ *H04L 9/0643* (2013.01); *G06F 16/9014* (2019.01); *G06F 16/9024* (2019.01); *G06F 40/166* (2020.01); *G06N 7/00* (2013.01); *G06N 10/20* (2022.01); *G06N 10/40* (2022.01)

(58) Field of Classification Search
None
See application file for complete search history.

(56) References Cited

U.S. PATENT DOCUMENTS

2022/0292385 A1 9/2022 Sauvage

OTHER PUBLICATIONS

Preston, Richard H. "Applying Grover's algorithm to hash functions: a software perspective." IEEE transactions on quantum engineering 3 (2023): 1-10. (Year: 2023).*
Sobti, Rajeev, and Ganesan Geetha. "Cryptographic hash functions: a review." International Journal of Computer Science Issues (IJCSI) 9, No. 2 (2012): 461. (Year: 2012).*
Sadeghi-Nasab, Alireza, and Vahid Rafe. "A Comprehensive Review on Broken Hashing Algorithms." Undated. 11 pages. (Year: XXXX).*
(Continued)

*Primary Examiner* — Vincent Gonzales
(74) *Attorney, Agent, or Firm* — 24IP Law Group USA, PLLC; Timothy R DeWitt

(57) ABSTRACT

A method for modifying a variable string (330) in a document (300) and generating a required hash value, wherein the document (300) comprises the variable string (330) and a fixed string (320). The method comprises constructing (S220) a Hamiltonian based on the variable string (330), encoding (S230) the variable string (330) into a quantum circuit (310), generating in a hash function generator (350) a hash value from the fixed string (320) and the output of the quantum circuit (310), determining (S280) an overlap between the generated hash value and a true hash value (370), and, on reaching a zero overlap value, determining the variable string (330), otherwise optimising (S270) parameters of the quantum circuit (310).

10 Claims, 3 Drawing Sheets

(56) References Cited

OTHER PUBLICATIONS

"SHA-1 is a shamble" at the USENIX Security Conference in 2020. The paper is available at https://eprint.iacr.org/2020/014.pdf (accessed on Nov. 15, 2022).
Wang Zeguo et al. "Variational quantum attacks threaten advanced encryption standard based symmetric cryptography" at Science China Information sciences, Beijing, vol. 65, No. 10, Jul. 18, 2022, https://doi.org/10.1007/s11432-022-3511-5.
Winternitz Robert S: "A Secure One-Way Hash Function Built from DES", 1984 IEEE Symposium on Security and Privacy, Los Alamitos, CA, US, published on Apr. 29, 1984, DOI: 10.1109/SP.1984.10027.
Araz et al. "Classical versus Quantum: comparing Tensor Network-based Quantum Circuits on LHC data" at https://arxiv.org/abs/2202.10471.
Zeguo Wang et al: "A Variational Quantum Attack for AES-like Symmetric Cryptography", arxiv.org, Cornell University Library, 201 Olin Library Cornell University Ithaca, NY 14853, May 7, 2022 (May 7, 2022), XP091222329.
Denisenko D V et al: "Application of Grover's Quantum Algorithm for SDES Key Searching", Journal of Experimental and Theoretical Physics, Pleiades Publishing, Moscow, vol. 128, No. 1, Apr. 8, 2019 (Apr. 8, 2019), pp. 25-44, XP036753782.
Denisenko Denis: "Quantum differential cryptanalysis", Journal of Computer Virology and Hacking Techniques, Springer Paris, Paris, vol. 18, No. 1, Sep. 3, 2021 (Sep. 3, 2021), pp. 3-10, XP037700191.

* cited by examiner

METHOD AND SYSTEM FOR MODIFYING DOCUMENT WITHOUT CHANGING HASH VALUE

BACKGROUND OF THE INVENTION

Field of the Invention

The invention relates to a method and system for modifying a document without changing hash values of the document.

Brief Description of the Related Art

A hash function is any function that can be used to map data of arbitrary size to fixed-size values. The values returned by the hash function are called hash values, hash codes, digests, or simply hashes. The hash functions and their associated hash tables are used in data storage and retrieval applications to reduce the amount of storage size, but also to ensure data integrity and authentication of messages.

Data integrity is the maintenance of, and the assurance of, data accuracy and consistency and is an aspect that needs to be considered in the design, implementation, and usage of any system that stores, processes, or retrieves data. The overall intent of a method, such as a hash function, for data integrity is to ensure that the data is recorded or stored exactly as intended and, upon later retrieval of the stored data, ensure the retrieved stored data is the same as when the data was originally stored. The hash function used for data integrity aims to prevent unintended (or unintentional) changes to information in the data stored.

Any unintended changes to the stored data as the result of a storage, retrieval or processing operation, including malicious intent, unauthorized access, unexpected hardware failure, and human error, is failure of data integrity. These unintended changes can be as benign as a single pixel in an image appearing with a different color than was originally recorded to the loss of vacation pictures or data from a business-critical database.

There are several reports about methods for breaking hash functions. For example, Laurent and Perrin presented a paper "SHA-1 is a shamble" at the USENIX Security Conference in 2020. The paper is available at https://eprint.iacr.org/2020/014.pdf (accessed on 15 Nov. 2022). The reports about the methods for breaking hash functions are often presented in the context of the implications for security and consistency of data.

There are, however, cases in which it is desired to modify the stored data from which the hash function was generated but to maintain the original generated hash value. This has not been possible in the art, but the advent of quantum computing suggests that this may be practical in the future.

The application of quantum computing offers the potential to overcome this challenge using optimization algorithms. Currently we are in the noisy intermediate-scale quantum (NISQ) era at which real-life quantum computing systems are characterized by a number of restrictions, such as a low number of qubits, low fidelity, and shallow quantum circuits. Under these restrictions, various classical-quantum hybrid algorithms have been proposed, including the variational quantum algorithm (VQA) and the Quantum Approximate Optimization Algorithm (QAOA). VQA and QAOA quantum-classical hybrid algorithms have been found to have significant advantages in solving combinatorial optimization and Hamiltonian ground state problems.

SUMMARY OF THE INVENTION

This document will describe a computer-implemented method to attack hash functions and to generate a hash value from a modified document.

The method and system described in this document enables part of the data in a document, such as a variable string, to be modified in the document but still produce the same hash value when passed to a hash function generator.

The method for modifying the variable string in a document and generating a required hash value will now be outlined. The document comprises both the variable string and a fixed string. The term "string" is used in this context to indicate a sequence of characters in the document. The method comprises constructing a Hamiltonian based on the variable string and then encoding the variable string into a quantum circuit. A hash function generator generates a hash value from the fixed string and the output of the quantum circuit and then an overlap is determined between the generated hash value and a true hash value. On reaching a zero-overlap (or a substantially zero overlap) value, the parameters of the quantum circuit are determined for the variable string, otherwise optimizing the parameters of the quantum circuit.

The step of optimising the parameters of the circuit uses a classical optimization algorithm, such as, but not limited to, a gradient descent method.

The encoding of the variable string into the quantum circuit is one of encoding into a parameterized quantum circuit or a tensor network and the constructing of the Hamiltonian comprises creating a graph with a plurality of nodes representing the bits of the variable string.

The determining of the overlap is carried out by calculating the Hamming distance between the generated hash value and the true hash value.

A system for modifying a variable string in a document and generating a required hash value is also disclosed. The system comprises at least one input/out device for inputting the document, at least one quantum circuit for encoding the variable string, a hash function generator for creating hash values from an output of the at least one quantum circuit, a comparator for comparing the created hash values with a true hash value, and at least one optimization element for adjusting the parameters of the quantum circuit.

The quantum circuit is implemented as one of a quantum annealer or a quantum gate computer and can be is implemented in a quantum computer or simulated in a classical computer.

BRIEF DESCRIPTION OF THE FIGURES

For a more complete understanding of the present invention and the advantages thereof, reference is now made to the following description and the accompanying drawings, in which.

DETAILED DESCRIPTION OF THE INVENTION

The invention will now be described on the basis of the drawings. It will be understood that the embodiments and aspects of the invention described herein are only examples and do not limit the protective scope of the claims in any way. The invention is defined by the claims and their equivalents. It will be understood that features of one aspect or embodiment of the invention can be combined with a feature of a different aspect or aspects and/or embodiments of the invention.

Figure 1:
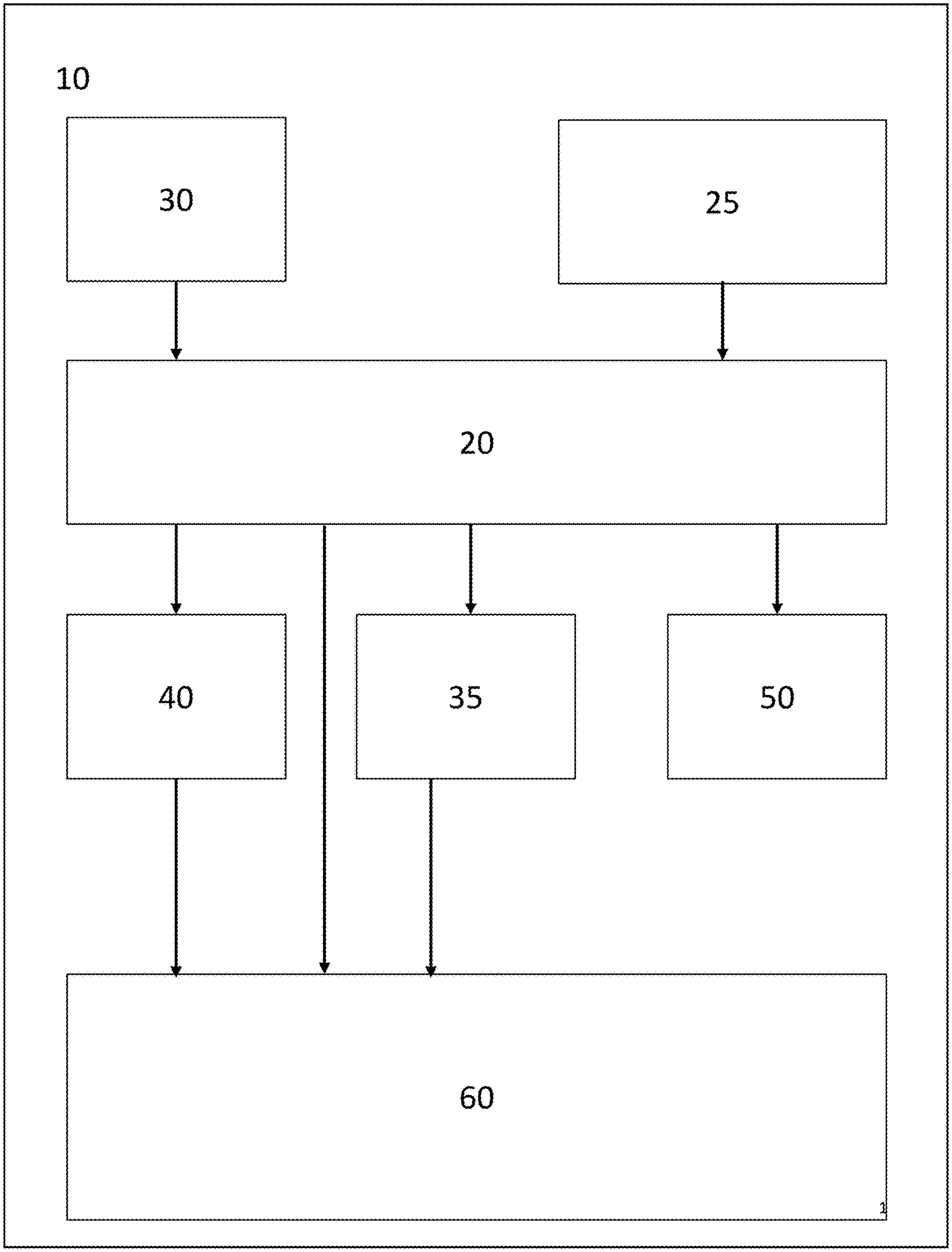
FIG. 1 shows an overview of a hybrid classical-quantum system.

FIG. 1 shows an overview of a typical hybrid classical-quantum system which can be used for performing the method set out in this document. FIG. 1 shows an overview of a computing system 10 for implementing the method of this document. The computing system 10 is, for example, a hybrid quantum and classical system and comprises, in an example, a (classical) central processing unit 20 which is connected to a data storage unit 25 (i.e., one or more memory devices), and a plurality of input/output devices 30. The input/output devices 30 enable input of one or more images and an output of a result for the one or more of the images.

A graphics processing unit 35 for processing vector calculations and a field programmable gate array (FGPA) 40 for control logic that can also be connected to the central processing unit 20. A quantum processor 50 (also termed quantum accelerator) is connected to the classical central processing unit 20. In an alternative embodiment, the quantum processor 50 is emulated on a classical processor.

In one implementation of the computing system 10, the quantum processor 50 is a gate-based quantum processor. Alternatively, the quantum processor 50 could be a quantum annealing processor. It is also possible to use a quantum processor 50 which is a quantum annealing system. The computing system 10 is connected to a computer network 60, such as the Internet. It will be appreciated that the computing system 10 of FIG. 1 is merely exemplary and other units or elements may be present in the computing system 10. It will also be appreciated that there may be many input/output (I/O) devices 30 located at multiple locations and that there may be a plurality of data storage units 25 also located at multiple locations. The many I/O devices 30 and data storage units 25 are connected by the computer network 60.

Figure 2:
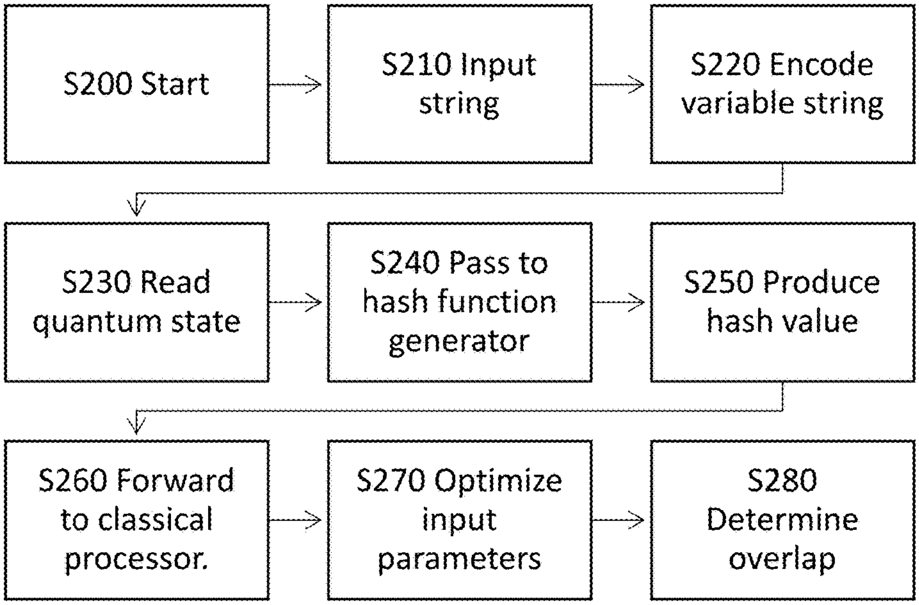
FIG. 2 shows an outline of the method.
Figure 3:
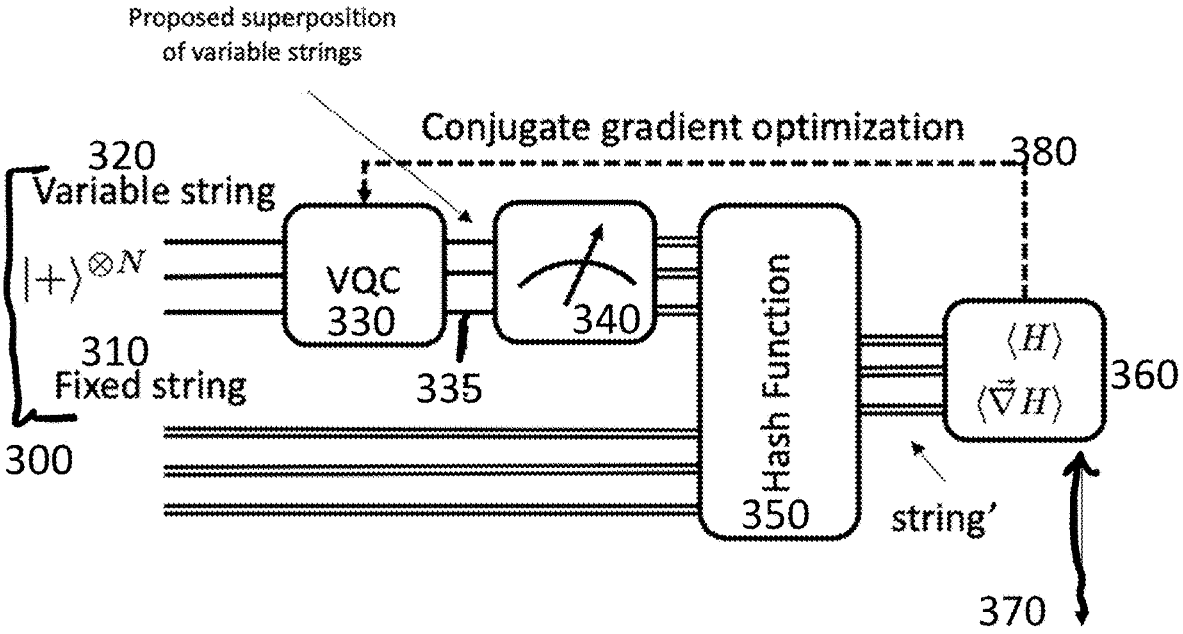
FIG. 3 shows elements used in the method.

The method is illustrated in FIGS. 2 and 3 and will now be described. The method starts in step S200. A document 300 has two components: a fixed string 310 with a set of data, such as a sequence of characters or set of pixels, which do not need to be changed and a variable string 320 with a set of data which needs to be changed. One example of the variable string could be correction of data or the replacement of a signature on the document 300.

In a first step S210, the document 300 with both the fixed string 310 and the variable string 320 is input into the system 100 through one (or more) of the input/output devices 30 and, in step S220, a Hamiltonian is constructed whose ground state corresponds to the variable string 320. The construction of the Hamiltonian is outlined below.

The variable string 320 is encoded in step S220 into an adjustable quantum state by a quantum circuit which is in this case a parameterized quantum circuit (PQC) 330 (which is also known as an ansatz). PQC output 335 of the parameterized quantum circuit 320 is a superposition of values and read out in step S230 by a measurement device 340 and passed in step S240 as an input to a hash function generator 350 in the (classical) central processing unit 20. The hash function generator 350 is not limited to particular hash functions. Non-limiting examples of hash functions include folding, division hashing, multiplicative hashing as well as other known hashing functions and indeed customized hash functions combining several known hash functions.

The hash function generator 350 takes as its input both the set of values from the PQC output 335 and the fixed string 310 and produces in step S250 a set of hash values which can be compared with a true hash value 370 in a comparator 360. The comparator 360 produces a Hamiltonian of the Hamming distances between the true hash value 370 and the set of hash values produced by the hash function generator 350.

The Hamiltonian is forward to a classical optimization algorithm 380 in the classical central processing unit 20. The optimization algorithm is used to adjust in step S270 the input parameters of the parameterized quantum circuit 330 to arrange for the output of the hash function generator 350 to have an overlap with the true hash value 370 in step S280. The overlap occurs when the Hamming distance is zero (or very close to zero). At this point, the parameters of the parameterized quantum circuit 330 are known and the output of the hash function generator 350 can be used to create from the variable string 320 a hash value which is the same as the true hash value 370 despite having a different variable string 320.

An example of the implementation of the VQAA will serve to illustrate this method. The variable string 320 is encoded in the Hamiltonian (step S220).

As noted above, the variational process (i.e., step S270) is started to find the lowest energy of the Hamiltonian. This is done by using each bit in the variable string 320 as a node to construct regular graphs. It is possible, for an 8-node network, to construct an n-regular (where n=1, 2 . . . , 7) graph. In practice, it is chosen that n=3 (although this is not limiting of the invention and other options may be also possible). It will be appreciated that the number of nodes is not limiting of the invention.

Figure 4:
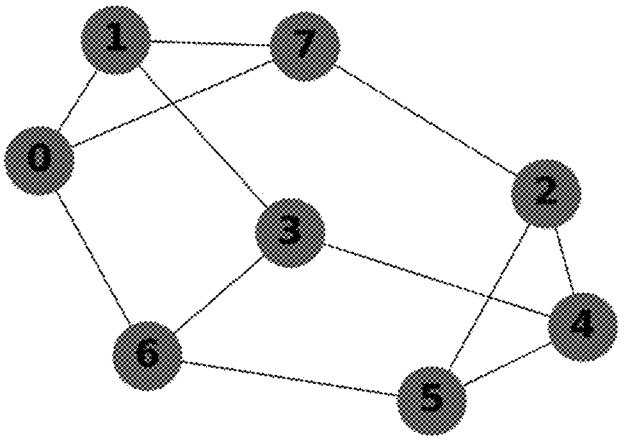
FIG. 4 shows a 3-regular graph.

The known variable string 320 is encoded in the step S220 into the Hamiltonian ground state and this will now be described. Each of the eight bits of the variable string 320 is used as a node to construct an 8-node 3-regular graph. The value of the i-th node is denoted by V(i), which is the value of the i-th bit. If there is a pair of nodes (i, j) in the graph that are connected, the term $w_{ij}Z_iZ_j$ is added into the Hamiltonian, where Z is the Pauli-Z operator, $i, j \in \{0, 1, \ldots, 7\}$. The coefficient $w_{ij}$ is determined by V (i) and V (j): $w_{ij}=+1$ if V(i)=V(j), and −1 otherwise. Additionally, the single-qubit terms $t_iZ_i$ are added, such that $t_i=0.5$ if V(i)=1, and −0.5 if V(i)=0. The resulting 3-regular graph shown in FIG. 4. The corresponding Hamiltonian is:

$$H = w_{01}Z_0Z_1 + w_{06}Z_0Z_6 + w_{07}Z_0Z_7 + w_{13}Z_1Z_3 + w_{17}Z_1Z_7 + w_{24}Z_2Z_4 + w_{25}Z_2Z_5 + w_{27}Z_2Z_7 + w_{34}Z_3Z_4 + w_{36}Z_3Z_6 + w_{45}Z_4Z_5 + w_{56}Z_5Z_6 + \sum_{i=0}^{7} t_iZ_i.$$

Figure 5:
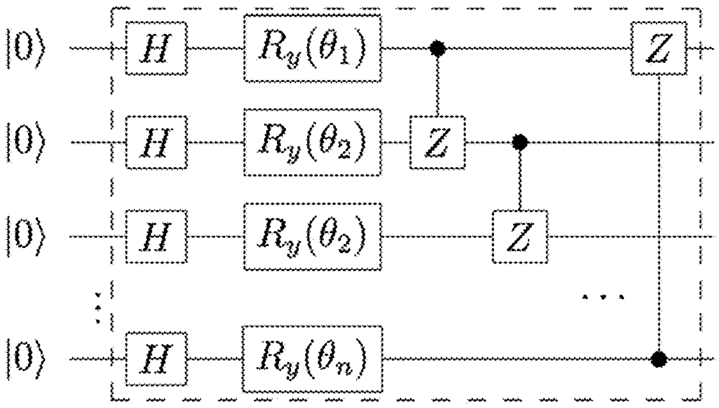
FIG. 5 shows a parameterized quantum circuit.

The cost function E(β) is the expectation value of the Hamiltonian where |β> is the superposition of the variable string 320. The parameterized quantum circuit 310 is the ansatz shown in FIG. 5. It will be appreciated, however, that other variational quantum circuits could be implemented as well without further restrictions. The exemplary implementation shown in FIG. 5 and described in this document requires ten parameters (β/θ) and its circuit depth is 12. The initial state is prepared as the uniform superposition state. The PQC/ansatz 310 gives a linear combination of all possible values of the variable string.

On another implementation, the Hamiltonian is the Hamming distance between the bit strings.

The variational process starts to find the Hamiltonian with the lowest energy. This Hamiltonian with the lowest energy state is expected to contain the corresponding key. The superposition of the variable string 320 is measured in step S240 and the result is forwarded in step 260 to a classical optimization algorithm 380 running on a classical central processing unit 20 to adjust the input parameters of the quantum circuit 330. This variational process (adjusting the input parameters of the quantum circuit 330) continues until a zero overlap with the true hash value 370 is found.

In one non-limiting implementation, the classical optimization algorithm with best results is the Gradient Descent method with cut-off condition of −9, i.e., when the expectation of the Hamiltonian is less than −9, the first excited energy. GD is restarted when the norm of the gradient is lower than 0.8, the moment in which the parameters are randomly initialized. The learning rate is set to 1.08.

The VQAA can be improved in terms of better classical optimization algorithm, such as Adaptive Moment Estimation Algorithm (ADAM), better ansatz (less sequential ansatz to increase entanglement, in search) and better initial parameters (learning rate, cut-off condition, initial state).

In a further aspect, the method can be implemented using a quantum annealer, such as those from D-Wave, as the quantum processor 50. The quantum annealer is used to generate the variational states for the qubits (note: no non-orthogonal basis in this case). The variational parameters are the couplings of the D-Wave Hamiltonian and other annealing parameters (such as, but not limited to annealing schedule, extra magnetic fields).

A further aspect is the use of non-orthogonal qubit states: Current NISQ quantum devices have a limited number of qubits (as noted above) and are therefore only able to handle a small number of qubit variables. For current variational quantum algorithms in gate-based quantum computers, one qubit of the quantum computer is typically assigned to one bit variable of the cost function. The largest gate-based quantum computer as of today, built by IBM, has 433 superconducting qubits. Therefore, with the current approach, it is possible to optimize the cost functions up to 433 bits.

Current variational quantum optimization algorithms are based on e.g., Variational Quantum Eigensolvers (VQE). This approach fits very well into NISQ devices but is very hard to scale up to those cost functions involving many bits. This is because, in the current approach, each bit variable in the cost function corresponds to one qubit in the NISQ device. The NISQ devices have a limited number of qubits, and this limited number limits the applicability to large, realistic cost functions. This is limiting in cybersecurity applications.

One idea to overcome the problem of limited number of qubits is to modify the assignment between the quantum state of each individual qubit and the corresponding variable in the cost function. The method set out above has the correspondence as follows: $|0\rangle \rightarrow 0$, $|1\rangle \rightarrow 1$. In other words, a measurement in the 0/1 basis provides immediately the value of the bit variable. It is possible to extend the representability of classical discrete variables using different non-orthogonal states of one qubit. In particular, p maximally orthogonal states of one qubit could represent the values of a classical variable $q=0, 1, \ldots, p-1$. The maximally orthogonal states of one qubit correspond to Platonic solids inside of the Bloch sphere of the qubit, as illustrated in FIG. 6.

Using this Bloch sphere representation, it is possible to fit much larger optimization problems in variational quantum algorithms in the NISQ devices for cybersecurity attacks. As an example, for a processor of 433 qubits, with 40 states per qubit, it would be possible to optimize cost functions of up to 17,320-bit variables.

Figure 6:
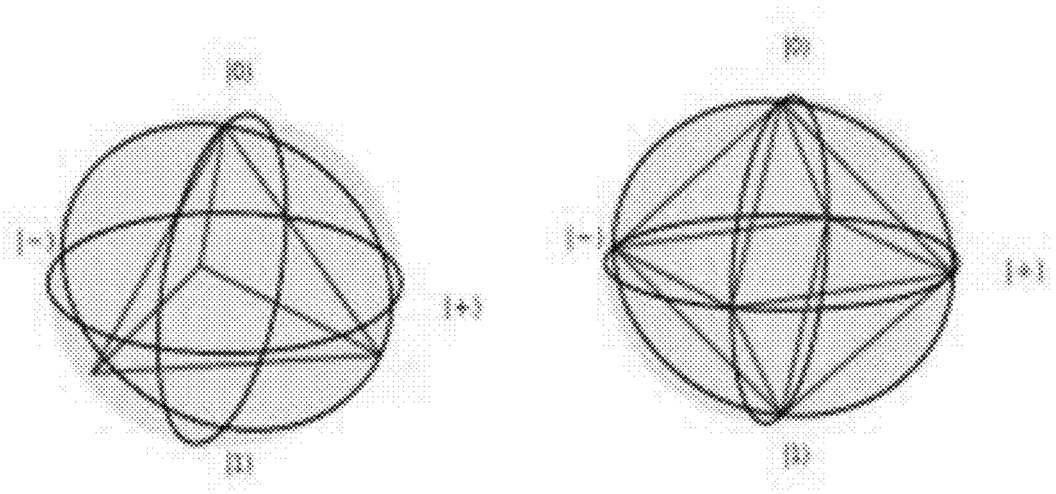
FIG. 6 shows Bloch spheres.

To implement an improved variational optimization algorithm such as in VQAA using the qubit states as in FIG. 6, it is necessary to slightly modify the measurement at the end of the quantum circuit. In this implementation of the algorithm, instead of implementing a measurement in the computational 0/1 basis, a quantum state tomography is implemented individually for the qubits. Quantum state tomography is a technique that determines, via measurements, the exact individual quantum state of a qubit in the Bloch sphere. In this way, the readout of the measurements would not be 0/1, but rather the quantum state of each qubit in their respective Bloch spheres, which would correspond, for each qubit, to some state as the ones in FIG. 6.

Other non-orthogonal encodings can also be used, including polyhedral, discretized qubit angles and continuum optimization.

It will be further appreciated that the use of the quantum variational circuits 320 could be replaced by tensor networks. In this case, the variable string 320 is encoded into the tensor network and the values of the tensors in the tensor networks are updated using gradient descent.

The search can also be parallelized by using more than one quantum variational circuit 330 to search for minima.

One further method of accelerating the search for the key is to identify the local minima (rather than trying to find the global minima) and subsequently test which one(s) of the local minima result in the key.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described to explain the principles of the invention and its practical application to enable one skilled in the art to utilize the invention in various embodiments as are suited to the particular use contemplated. It is intended that the scope of the invention be defined by the claims appended hereto and their equivalents. The entirety of each of the aforementioned documents is incorporated by reference herein.

REFERENCE NUMERALS

10 Computing system
20 Classical central processing unit
25 Data storage unit
30 Input/output devices
35 Graphical processing unit
40 Field programmable gate array
50 Quantum Processor
60—Computer network
300 Document
310 Fixed string
320 Variable string
330 Parameterised quantum circuit (PQC)
335 PQC output
340 Measurement device

350 Hash function generator
360 Comparator
370 True hash value
380 Optimization algorithm

What is claimed is:

1. A computer-implemented method for modifying a variable string in a document and generating a required hash value, wherein the document comprises the variable string and a fixed string, the fixed string comprising a first set of data, wherein said first set of data are not changed in the method, the variable string comprising a second set of data, wherein said second set of data are changed in the method, the method comprising:

constructing a Hamiltonian based on the variable string;

encoding the variable string into a quantum circuit comprising a plurality of qubits;

generating in a hash function generator a hash value from the fixed string and the output of the quantum circuit;

measuring a superposition of the variable string by a measurement device, wherein the measuring is implemented by a quantum state tomography individually for the plurality of qubits;

determining an overlap between the generated hash value and a true hash value; and on reaching a zero overlap value, determining the variable string, otherwise optimising parameters of the quantum circuit.

2. The method of claim 1, wherein the step of optimising the parameters of the circuit comprises using a classical optimization algorithm.

3. The method of claim 2, wherein the classical optimization algorithm is a gradient descent method.

4. The method of claim 1, wherein the encoding of the variable string into the quantum circuit is one of encoding into a parameterized quantum circuit or a tensor network.

5. The method of claim 1, wherein the constructing of the Hamiltonian comprises creating a graph with a plurality of nodes representing the bits of the variable string.

6. The method of claim 5, wherein the graph is a 3-regular graph.

7. The method of claim 1, wherein the determining is carried out by calculating the Hamming distance between the generated hash value and the true hash value.

8. A system for modifying a variable string in a document and generating a required hash value, wherein the document comprises the variable string and a fixed string, the fixed string comprising a first set of data, wherein said first set of data are not changed by the system, the variable string comprising a second set of data, wherein said second set of data are changed by the system, the system comprising:

at least one input/out device for inputting the document;

at least one quantum circuit for encoding the variable string, the quantum circuit comprising a plurality of qubits;

a hash function generator for creating hash values from an output of the at least one quantum circuit;

a measurement device for measuring a superposition of the variable string, wherein the measuring is implemented by a quantum state tomography individually for the plurality of qubits;

a comparator for comparing the created hash values with a true hash value; and at least one optimisation element for adjusting the parameters of the quantum circuit.

9. The system of claim 8, wherein the quantum circuit is implemented as one of a quantum annealer or a quantum gate computer.

10. The system of claim 8, wherein the quantum circuit is implemented in a quantum computer or simulated in a classical computer.

* * * * *